US006283092B1

United States Patent
Jung

(10) Patent No.: US 6,283,092 B1
(45) Date of Patent: Sep. 4, 2001

(54) METHOD FOR CONTROLLING ENGINE DURING MALFUNCTION OF COOLANT TEMPERATURE SENSOR

(75) Inventor: Chul-Hwa Jung, Pusan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/472,773

(22) Filed: Dec. 27, 1999

(30) Foreign Application Priority Data

Apr. 13, 1999 (KR) .................................................. 99-12889

(51) Int. Cl.$^7$ ...................................................... F02D 41/22
(52) U.S. Cl. .......................... 123/339.15; 374/1; 374/145; 701/113
(58) Field of Search ............................... 123/339.15, 359, 123/406.13, 479; 701/107, 113, 114; 374/1, 145

(56) References Cited

U.S. PATENT DOCUMENTS

| | | | |
|---|---|---|---|
| 4,556,029 | * 12/1985 | Yamaguchi et al. | 123/41.15 |
| 5,153,835 | * 10/1992 | Hashimoto et al. | 701/114 |

* cited by examiner

Primary Examiner—Andrew M. Dolinar
(74) Attorney, Agent, or Firm—Christie, Parker & Hale, LLP

(57) ABSTRACT

Disclosed is a method for controlling an engine during the malfunctioning of a coolant temperature sensor. The method includes the steps of determining whether the coolant temperature sensor is malfunctioning by using information supplied from various elements of a vehicle operation sensor; determining whether the engine is stalled when the coolant temperature sensor is malfunctioning; setting an initial value of information on the coolant temperature as a target value when the engine is stalled, and determining whether a start mode is canceled when the engine is determined to he operating; determining whether an air temperature sensor (ATS) is malfunctioning when the start mode is not canceled; setting, when the ATS is outputting information normally, the information on the air temperature as a target value, and performing addition and subtraction operations on the initial value of information and updating and learning the initial value of information with new information until the initial value of information reaches the target value of information; and outputting an engine control signal according to newly learned information on the coolant temperature, and when the newly learned information reaches the target value of information, terminating the updating of the initial value of information, and outputting an engine control signal to start the engine and to control idling of the engine after the engine is started by using the target value of information as the final learned information on the coolant temperature.

6 Claims, 6 Drawing Sheets

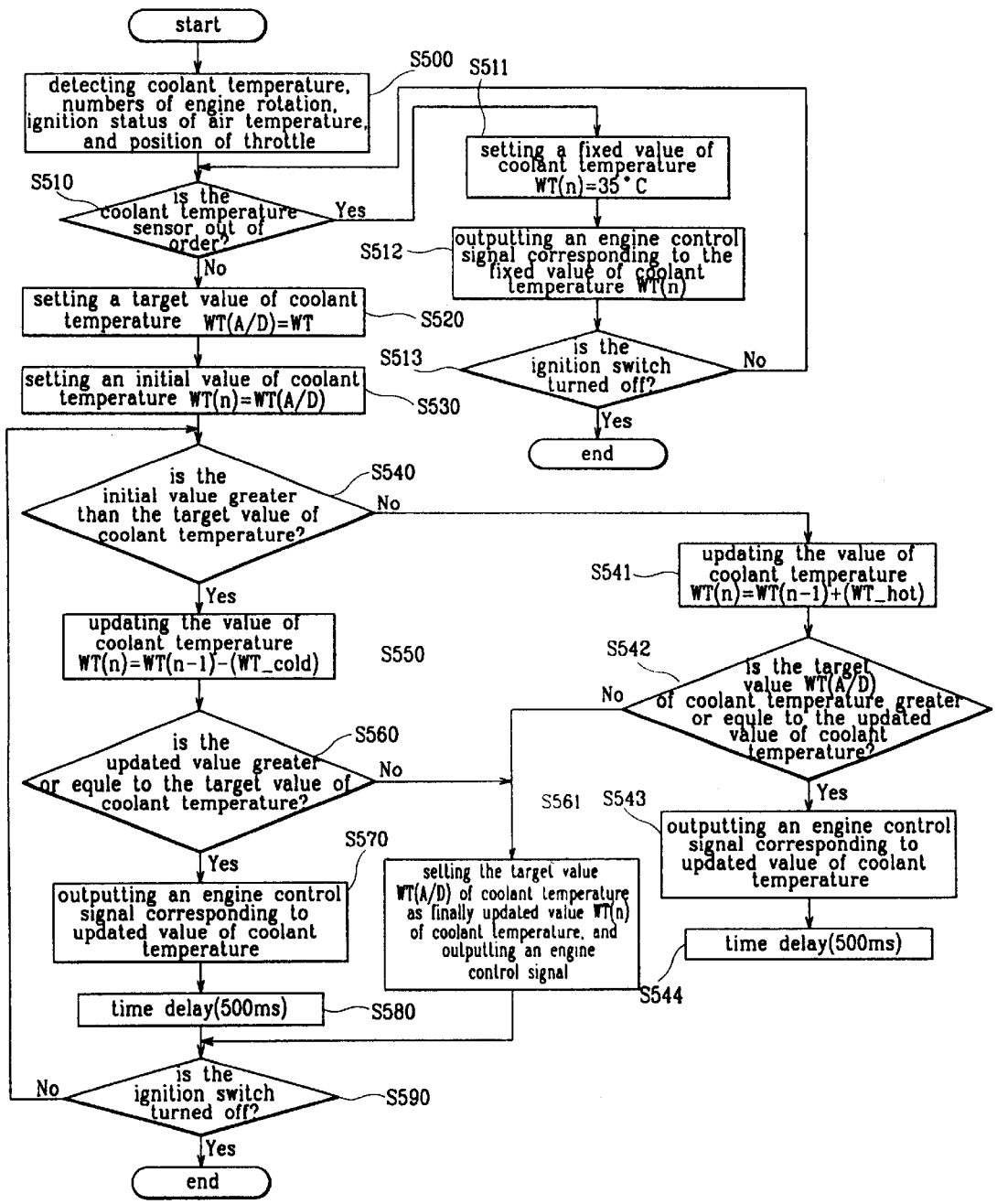
FIG.4 *PRIOR ART*

METHOD FOR CONTROLLING ENGINE DURING MALFUNCTION OF COOLANT TEMPERATURE SENSOR

FIELD OF THE INVENTION

The present invention relates to a method for controlling an engine. More specifically, the present invention relates to a method for controlling an engine during the malfunctioning of a coolant temperature sensor using output information of an air temperature sensor (ATS) instead of coolant temperature sensor information to realize normal operation of the engine.

BACKGROUND OF THE INVENTION

Among the information essential to control an engine is information output by a coolant temperature sensor. The coolant temperature sensor detects the temperature of engine coolant and outputs corresponding information. An engine electronic control unit (ECU) receives the information from the coolant temperature sensor and uses the information to help control various aspects of the engine such as ignition timing, idling speed, and fuel injection. When the coolant temperature sensor is malfunctioning and cannot output information on the coolant temperture, or outputs imprecise information, the ECU cannot perform normal control of the engine. Therefore, in the event that the coolant temperature sensor is malfunctioning, the ECU sets up a reference value that is used as a new value of the coolant temperature sensor, and controls the engine using this new value.

A conventional method to control the engine when the coolant temperature sensor is malfunctioning will now be described.

Referring to FIG. 1, an engine control apparatus, which has the capability of operating when the coolant temperature sensor is malfunctioning, comprises a vehicle operation sensor 10. The vehicle operation sensor 10 detects and outputs, among other vital information, ignition information and coolant temperature information that vary respectively according to driver manipulation of an ignition key and vehicle operation. The engine control apparatus also comprises an ECU 20 that receives all the information from the vehicle operation sensor 10. Using the information on the coolant temperature, the ECU 20 determines if the coolant temperature sensor is malfunctioning, and when the coolant temperature sensor is determined to be malfunctioning, establishes a predetermined fixed value as information on the coolant temperature sensor and outputs a control signal to control the engine. The engine control apparatus also comprises a drive control apparatus 30 that varies the ignition timing and adjusts both the amount of fuel that is injected into the engine, according to the engine control signal provided from the ECU 20.

The vehicle operation sensor 10 comprises an ATS 11 that detects a temperature of engine intake air and outputs corresponding information; an ignition coil 12 that detects variations in voltage occurring as a result of changes in engine rpm, and outputs engine rpm information; a coolant temperature sensor 13 that detects the temperature of the coolant and outputs corresponding information; an ignition switch sensor 14 that detects on and off states of the ignition switch and outputs corresponding information, the state of the ignition switch being altered according to driver manipulation of the ignition key; and a throttle valve switch 15 that detects throttle valve opening and outputs corresponding information, the throttle valve opening varying according to driver manipulation of an acceleration pedal.

Referring to FIG. 4, when the driver operates the ignition key to an on position such that power is supplied to the ECU 20, the ECU 20 reads the information on the coolant temperature, which varies according to changing vehicle driving states, output from the coolant temperature sensor 13 in step S500. Next, using this information, the ECU 20 determines whether the coolant temperature sensor 13 is outputting information normally (i.e., whether the coolant temperature sensor 13 is operating properly) in step s510.

In the event that the coolant temperature sensor 13 is not outputting information on coolant temperature or is outputting what is determined to be faulty coolant temperature information, the ECU 20 determines that the coolant temperature sensor 13 is malfunctioning. Accordingly, the ECU 20 sets a fixed value (commonly 35° C.) of the coolant temperature as an initial value WT(n) of the coolant temperature in step S511. Subsequently, the ECU 20 compensates for increases in coolant temperature, cranking, start, after-start, and idling, and outputs a predetermined engine control signal to the drive control apparatus 30 according to the compensated values in step s512. Next, the ECU 20 determines whether the ignition switch has been operated to an off position by the driver through detection of the ignition switch sensor 14 in step S513. If it is determined that the ignition switch has been turned off, all of the control operations are terminated.

However, in step s513 above, when it is determine that the ignition switch has not been controlled to off (i.e., maintained in an on state), the ECU 20 returns to step s510 of determining whether the coolant temperature sensor 13 is malfunctioning, and outputs to the drive control apparatus 30 an engine control signal, which is needed when the engine is started or for warm-up and acceleration after the engine is started. Using the engine control signal, the drive control apparatus 30 adjusts the ignition timing, idling, and fuel injection to levels suitable for when the engine is started, after the engine is started, or during acceleration.

On the other hand, if it is determined that the coolant temperature sensor 13 is operating normally such that it is outputting normal information on the coolant temperature (WT), the ECU 20, using the information provided from the coolant temperature sensor 13, compensates for increases in the coolant temperature during cranking, start, after-start, and idling to drive the engine, then outputs an engine control signal to the drive control apparatus 30 in steps s500~s590.

As mentioned above, information on the coolant temperature is used for controlling the driving of the engine when the engine is started, after the engine is started, and during acceleration. Therefore, when the coolant temperature sensor 13 normally detects information and outputs the result, no problem in controlling the engine results. However, when the coolant temperature sensor 13 is malfunctioning, many problems in driving the engine result.

One such problem resulting at the time the engine is started will be described.

Information on the coolant temperature provided from the coolant temperature sensor 13 ranges from −30 to about 100° C. The amount of fuel injected into the engine varies depending on the coolant temperature information provided from the coolant temperature sensor 13. In particular, a large amount of fuel (i.e., a rich air/fuel mixture) must be injected into the engine under cold starting conditions to enable easy starting of the engine. However, if the information on coolant temperature is not output or imprecisely output because of a malfunction in the coolant temperature sensor 13, the ECU 20 uses the fixed coolant temperature, which is applied when the coolant temperature sensor 13 is determined to be malfunctioning, to compensate for an increase in start needed for fuel injection when the engine is started. At this Lime, it the engine is being started under cold start conditions and the fixed coolant temperature is set at 80° C. while the actual coolant temperature is below 0° C., an insufficient amount of fuel is injected into the engine, making it impossible to start the engine. Furthermore, even if the engine is started, the idling state of the engine is unstable until the engine is warmed up. On the other hand, if the outside temperature is hot or if the engine is re-started after some driving such that the actual coolant temperate is 80° C., while the fixed coolant temperature is set at −4° C., too much fuel is injected into the engine such that starting the engine is not possible.

SUMMARY OF THE INVENTION

It is an object of the present invention to provide a method for controlling an engine during malfunction of a coolant temperature sensor. The method improves the starting of the engine under cold start conditions, and enables stable idling of the engine until he engine is warm.

In one aspect of the present invention, an engine control method when a coolant temperature sensor is out of order comprises the steps of determining whether the coolant temperature sensor is malfunctioning by using information on temperature of coolant supplied from a coolant temperature sensor, information on intake air supplied from an air temperature sensor (ATS), information on engine resolutions per minute (rpm) supplied from an ignition coil, information on on/off states of an ignition switch supplied from an ignition switch sensor, and information on throttle valve opening supplied from a throttle valve switch; determining whether the engine is stalled when the coolant temperature sensor is determined to be malfunctioning; setting an initial value of information on the coolant temperature as a target value of information on the coolant temperature that is set when the engine is stalled, and determining whether a start mode is canceled when the engine is determined to be operating; determining whether the ATS is malfunctioning when the start mode is not canceled; setting, when the ATS is outputting information normally, the information on the air temperature as a target value of information on the air temperature, and performing addition and subtraction operations on the initial value of information on the coolant temperature and updating and learning the initial value of information on the coolant temperature with new information on the coolant temperature until the initial value of information on the coolant temperature reaches the target value of information on the coolant temperature; and outputting an engine control signal according to newly learned information on the coolant temperature, and when the newly learned information on the coolant temperature reaches the target value of information on the coolant temperature, terminating the updating of the initial value of information on the coolant temperature, and outputting an engine control signal to start the engine and to control idling of the engine after the engine is started by using the target value of information on the coolant temperature as the final learned information on the coolant temperature.

BRIEF DESCRIPTION OF THE DRAWINGS

The accompanying drawings, which are incorporated in and constitute a part of the specification, illustrate an embodiment of the invention, and, together with the description, serve to explain tho principles of the invention:

FIG. 4 is a flow chart of a conventional method for controlling an engine during the malfunctioning of a coolant temperature sensor.

DETAILED DESCRIPTION OF THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
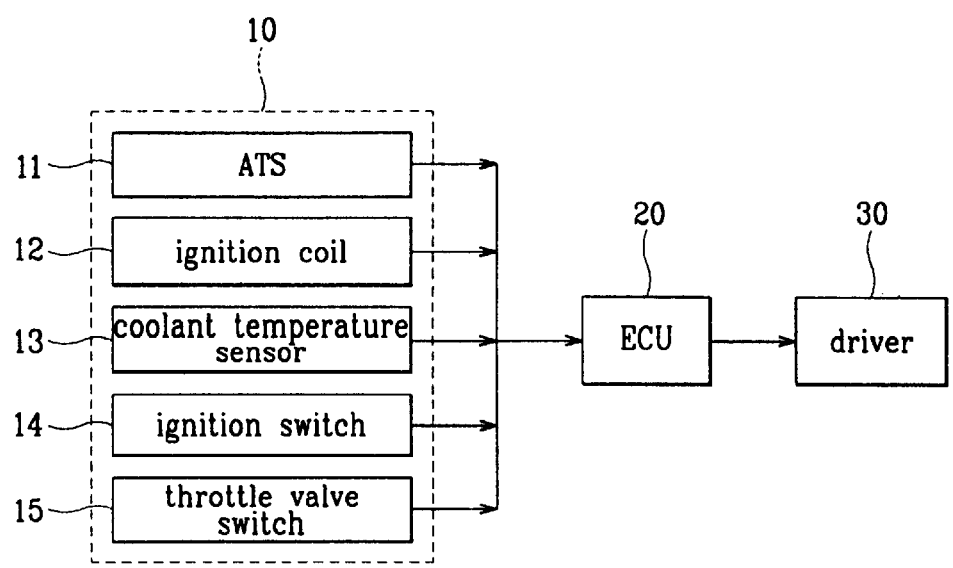
FIG. 1 is a block diagram of a conventional engine control system.
Figure 2A:
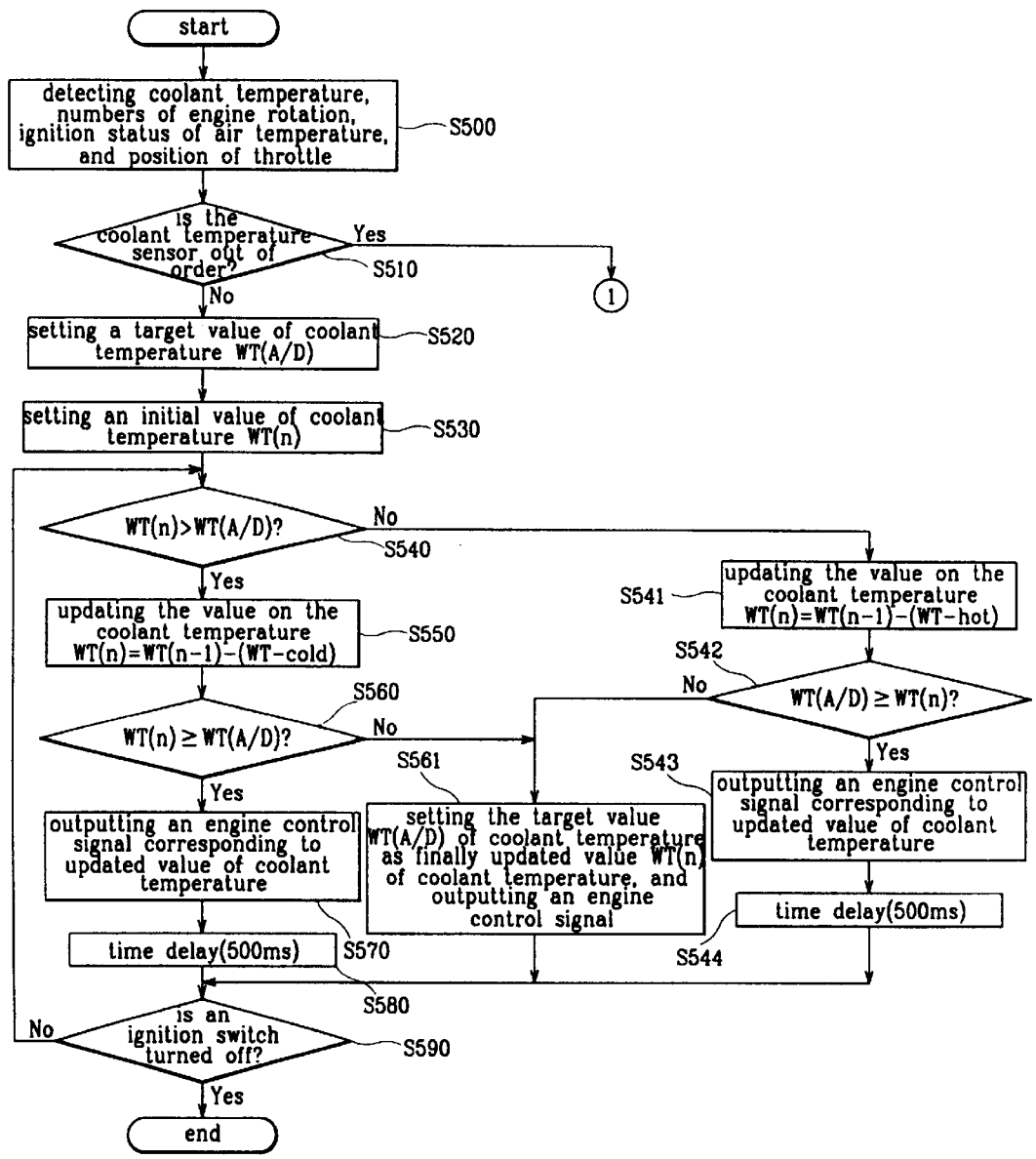
FIGS. 2(a), 2(b), and 2(c) are flow charts of a method for controlling an engine during the malfunctioning of a coolant temperature sensor according to a preferred embodiment of the present invention.
Figure 2B:
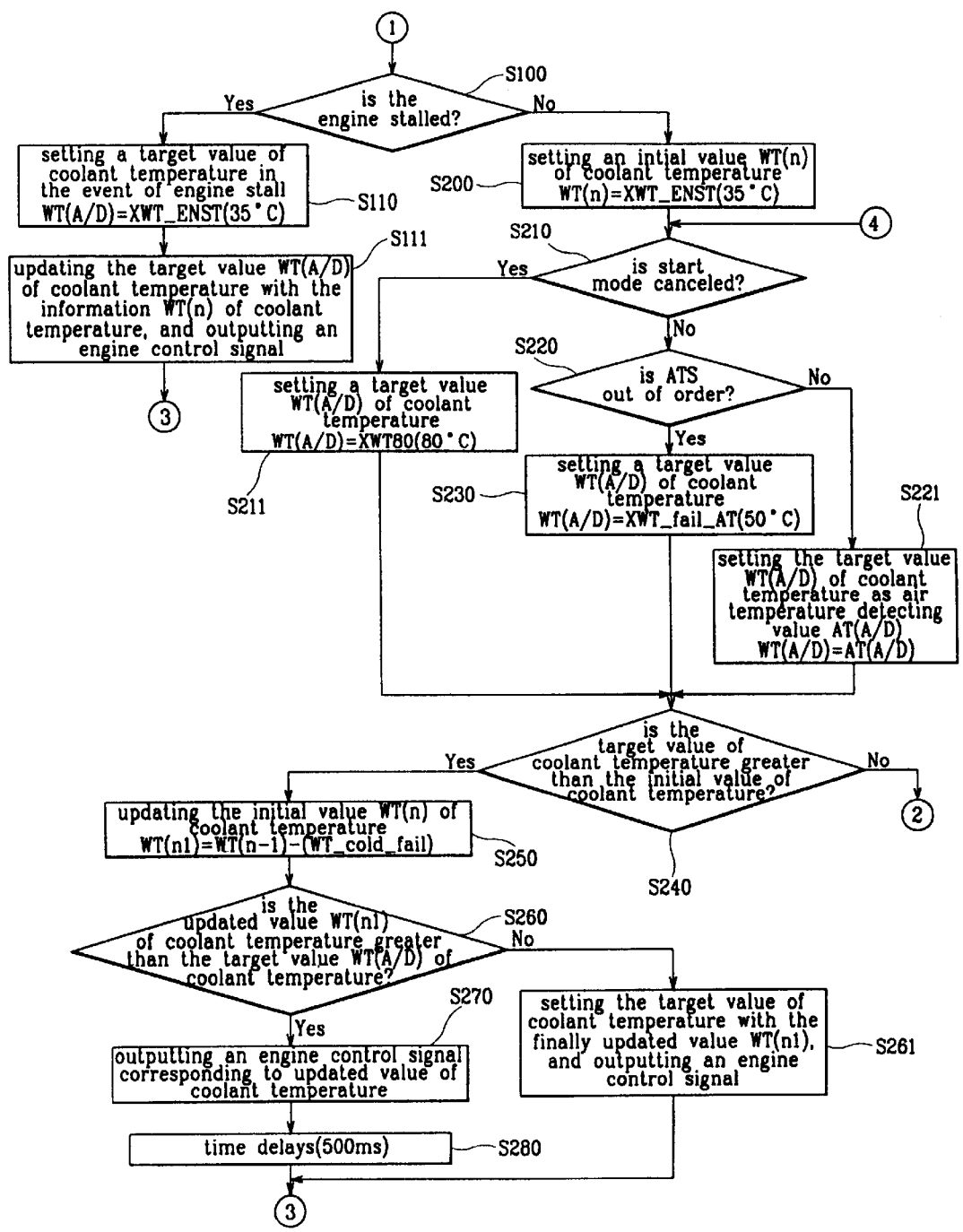
Figure 2C:
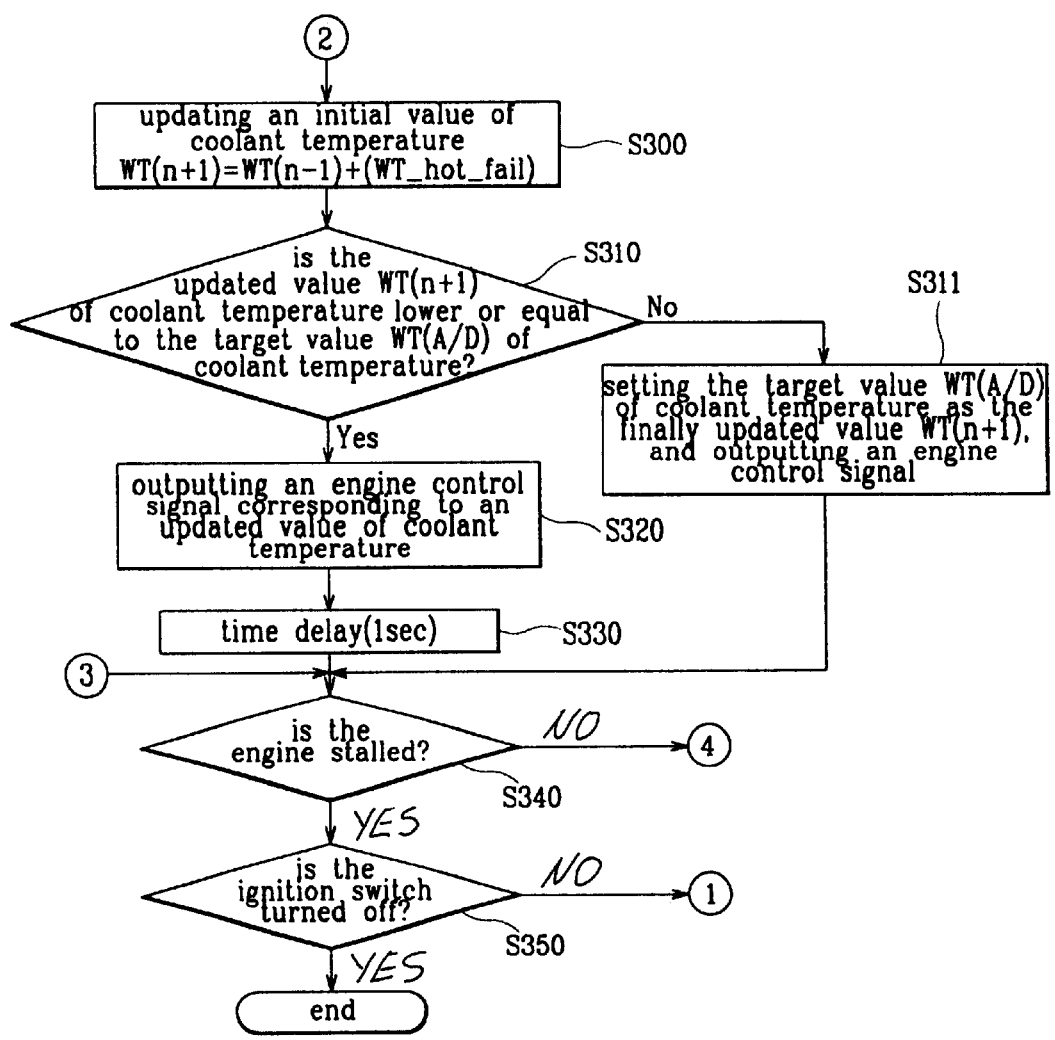

Referring to FIGS. 2a, 2b and 2c, when a coolant temperature sensor is malfunctioning, the present invention uses various engine control methods according to different vehicle conditions. These different conditions of the vehicle include engine stall, normal output by the ATS on intake air temperature, malfunctioning of the ATS, and a condition of post-engine starting. Reference is made also to FIG. 1 because the method of the present invention is applied using a conventional engine control system.

First, an ECU 20 determines whether a coolant temperature sensor 13 is malfunctioning according to information provided from the coolant temperature sensor 13 of a vehicle operation sensor 10. When the coolant temperature sensor 13 of the vehicle operation sensor 10 outputs information in a normal manner, the ECU 20 outputs an engine control signal to a drive control apparatus 30 to control the engine during and after the starting the engine in the same manner as with the conventional method in steps s500~s590.

1) An Engine Control Method During Engine Stall:

When an engine is determined to be stalled because of a breakdown in the coolant temperature sensor 13 of the vehicle operation sensor 10, the ECU 20 sets a target value WT(A/D) of information on the coolant temperature, used when the engine is stalled, as a value (XWT_ENST=35° C.) of information on the fixed coolant temperature when the engine stalls in steps of s100 and s110. At this time, the engine is determined to be stalled when engine rpm is less than 50 rpm.

The ECU 20 then learns the value of information on the coolant temperature WT(n) as the target value WT(A/D) of information on the coolant temperature, and outputs a predetermined engine control signal corresponding to the learned value of information on the coolant temperature WT(n) so as to perform control of operations such as ignition timing and fuel injection in step s111. The ECU 20 then determines whether the ignition switch has been turned off as a result of driver manipulation of the ignition key in steps s340 and s350.

If it is determined that the ignition switch has been turned off, all the control operations are terminated. However, if it is determined that the ignition switch is maintained in an on state, the ECU 20 again determines whether the engine is stalling, returning to step s100.

When engine rpm is determined to be over 50 rpm, the ECU 20 determines that the engine is not stalled, and sets the initial value WT(n) of information on the coolant temperature with the reference value (XWT_ENST=35° C.) that is fixed when the engine is stalling, then determines whether the start mode is canceled to determine whether the starting of the engine is completed in steps s200 and s210. When it is determined that the start mode is not canceled, the ECU 20 determines whether the ATS 11 is malfunctioning by using information on the air temperature from the ATS 11 in step s220.

2) An Engine Control Method when the ATS 11 is Operating Normally:

When the ATS 11 is operating normally to output correct information (AT(A/D)=−4° C.) on the air temperature, the ECU 20 sets the target value WT(A/D) of information on the coolant temperature with information (AT(A/D)=4° C.) on the air temperature provided from the ATS 11, and compares the target value WT(A/D=−4° C.) of information on the coolant temperature with the initial value (WT(n)=35° C.) of information on the coolant temperature set in step s300, then determines the result in steps s221 and s240.

Figure 3:
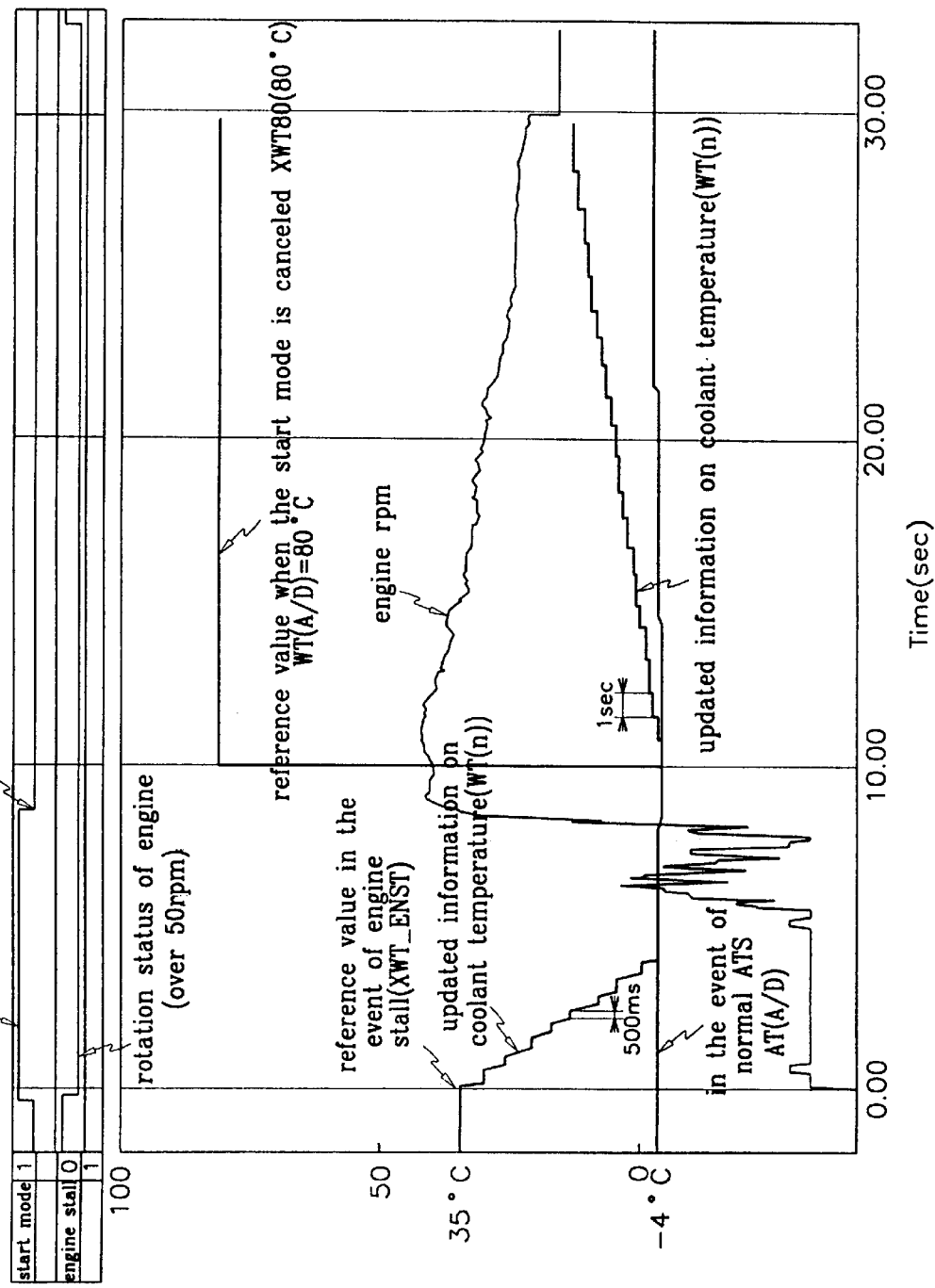
FIG. 3 is a graph of outputs of information on tire coolant temperatures, each of which is set according to states of a vehicle in the event a coolant temperature sensor is malfunctioning according to a preferred embodiment of the present invention.

When the initial value (WT(n)=35° C.) of information on the coolant temperature is greater than the target value WT(A/D=−4° C.) of information on the coolant temperature, the ECU 20 determines that the coolant temperature is low, and reduces the initial value WT(n) of information on the coolant temperature by −5° C. for each predetermined period of 500 ms to update the information with new information on the coolant temperature WT(n1) as shown in FIG. 3. The ECU 20 then performs a computation for learning as shown in Equation 1, and outputs to the drive control apparatus 30 an engine control signal to start the engine, after which the ECU 20 determines whether the engine is stalled in steps s250, s260, s270, s280, and s340.

$$W/T(n1)=W/T(n-1)-(WT\_cold\_fail)$$

$$WT(n1) \geq WT(A/D) \qquad \text{Equation 1}$$

where, WT(A/D) is a target value of information on the coolant temperature, WT(n1) is updated information on the coolant temperature, WT(n−1) is learned information on the previous reference temperature (5° C.).

When the information on the newly learned coolant temperature WT(n1) updated by Equation 1 is smaller than the target value (WT(A/D)=−4° C.) of the coolant temperature, the ECU 20 discontinues the updating of information on the coolant temperature WT(n1), learns the target value WT(A/D) of information on the coolant temperature as information on a final coolant temperature WT(n1), and outputs to the drive control apparatus 30 an engine control signal to start the engine using WT(n1) in stop s261. The drive control apparatus 30 adjusts the ignition timing according to the engine control signal provided from the ECU 20 and adjusts a fuel injection amount to inject a large amount of fuel so as to enable the starting of the engine.

When the engine starts, the engine start mode is canceled. However, when the engine does not start, the ECU 20 again determines whether the engine is stalled. If it is determined that the engine is not stalled, the process returns to step s210 of determining whether the start mode is canceled in step s340. However, if it is determined that the engine is continuously stalled, the ECU 20 terminates all the control methods when the ignition switch is turned off by driver manipulation of the ignition key. On the other hand, if the ignition switch is turned on, the ECU 20 determines that the coolant temperature sensor 13 is malfunctioning, and again controls the engine using information output by the ATS 11 by returning to step s100 of determining whether the engine is stalled.

3) An Engine Control Method when the Coolant Temperature Sensor 13 and ATS 11 are Malfunctioning:

If the ATS 11 is determined to be malfunctioning while the start mode is not canceled, the ECU 20 sets the target value WT(A/D) of information on the coolant temperature with a fixed value (XWT_fail_AT=50° C.) that is set at the time the ATS 11 broke down, and compares the target value (WT(A/D)=50° C.) of information on the coolant temperature with the initial value (WT(n)=35° C.) of the coolant temperature set in the stop s200, then determines the result of the comparison in step s240.

In the event that the initial value (WT(n)=35° C.) of the coolant temperature is lower than the target value (WT(A/D)=50° C.) of information on the coolant temperature, the ECU 20 determines that the (coolant temperature is high, and executes Equation 2 below such that the initial value of information on the coolant temperature is gradually increased by 1° C. every one second period until the initial value (WT(n)=35° C.) of information on the coolant temperature becomes identical with the target value (WT(A/D)=50° C.) of information on the coolant temperature as shown in FIG. 3. The increased initial value WT(n) of information on the coolant temperature is updated with new information WT(n+1) on the coolant temperature such that a learning process is performed, and an engine control signal to start the engine is output to the drive control apparatus 30 using information WT(n+1) on the learned coolant temperature, after which it is determined whether the engine is stalled in steps s300 through s340.

$$WT(n+1)=WR(n-1)+(WT\_hot\_fail)$$

$$WT(n+1) \leq WT(A/D) \qquad \text{Equation 2}$$

where, WT(A/D) is the target value of information on the coolant temperature, WT(n+1) is updated information on the coolant temperature, WT(n−1) is learned information on the previous coolant temperature, and WT_hot_fail is a reference update temperature (1° C.).

When the updated information WT(n+1) on the coolant temperature becomes greater than the target value WT(A/D) of information on the coolant temperature, the ECU 20 terminates the updating of the value WT(n+1) of information on the coolant temperature, and outputs an engine control signal to start the engine to the drive control apparatus 30, and determines whether the engine is stalled in steps s311 and s340. When it is determined that the engine is not stalled, the ECU 20 determines whether the start mode is terminated. If the start mode is terminated, the ECU determines whether the start of the engine is terminated.

4) An Engine Control Method when the Engine is Started (when canceling the start mode):

When starting of the engine is discontinued, the ECU 20 terminates the start mode to start the engine. Hence, when the start mode is terminated, the ECU 20 sets information WT(n) on the coolant temperature, which is finally learned when the engine is started so as to maintain the engine in a stable state during the interval from when the engine is started until the engine is warmed up, as information on the current coolant temperature, then sets the target information of the coolant temperature (XWT80=80° C.) depending on the termination of the engine start as the target value WT(A/D) of information on the coolant temperature in steps s210 and s211 as shown in FIG. 3. WT(n) is information WT(n1) or WT(n+1) on the coolant temperature that is finally learned at the time the engine is started. When the coolant temperature sensor 13 is malfunctioning, WT(n)=−4° C. When the coolant temperature sensor 13 and ATS 11 are both malfunctioning, WT(n)=50° C. WT(A/D) is a target value (XWT80=80° C.) of information on the coolant temperature after the engine is started.

The ECU 20 compares the target value (XWT80=80° C.) of information on the coolant temperature with information WT(n) on the learned coolant temperature that is finally learned to start the engine, and determines the result in step s240.

When the target value (XWT80=80° C.) of information on the coolant temperature is greater than information WT(n) on the learned coolant temperature, the ECU 20 gradually increases information WT(n) on the coolant temperature, which is finally learned at the time the engine is started so as to control the idling of the vehicle in a stable state from the time the engine is started until the engine is warmed up, to the target value (WT(A/D) of information on the coolant temperature by 1° C. each time to update information on the coolant temperature, thereby updating and re-learning the learned information on the coolant temperature. The ECU 20 outputs an engine control signal to the drive control apparatus 30 using the re-learned information WT(n) on the coolant temperature as information on the coolant temperature of the vehicle.

When the updated and re-learned information WT(n) on the coolant temperature exceeds the target value WT(A/D) of information on the coolant temperature, the ECU 20 no longer updates the learned information WT(n) on the coolant temperature, recognizes the target value WT(A/D) of information on the coolant temperature as the final information WT(n) on the coolant temperature, and sets the final learned information WT(n) on the coolant temperature as information on the coolant temperature of the vehicle, after which the ECU 20 outputs an engine control signal to control engine idling to the drive control apparatus 30 in steps s300 through s330.

However, when the target information (XWT80=80° C.) on the coolant temperature is lower than the finally learned information WT(n) on the coolant temperature to start the engine, the ECU 20 rapidly reduces the information WT(n) on the coolant temperature, which is finally learned at the time the engine is started, to the target value WT(A/D) of information on the coolant temperature by −5° C. each 500 msec so as to stably control idling of the vehicle from the time the engine is started until the engine is warmed up, and updates and re-learns the learned information on the coolant temperature using Equation 1. The ECU 20 outputs an engine control signal to the drive control apparatus 30 using the re-learned information WT(n) on the coolant temperature as information on the coolant temperature of the vehicle.

When the updated and re-learned information WT(n) on the coolant temperature exceeds the target value, WT(A/D) of information on the coolant temperature, the ECU 20 no longer updates the learned information WT(n) on the coolant temperature and learns the target value WT(A/D) of information on the coolant temperature as the final information WT(n) on the coolant temperature, after which the ECU 20 establishes the final learned information WT(n) on the coolant temperature as information on the coolant temperature of the vehicle and outputs an engine control signal to control engine idling to the drive control apparatus 30 in steps s250 through s280.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling an engine during the malfunctioning of a coolant temperature sensor, comprising the steps of:

determining whether the coolant temperature sensor is malfunctioning by using information on temperature of coolant supplied from the coolant temperature sensor, information on intake air supplied from an air temperature sensor, information on engine rpm supplied from an ignition coil, information about on and off states of an ignition switch supplied from an ignition switch sensor, and information about a throttle valve opening supplied from a throttle valve switch;

determining whether the engine is stalled when the coolant temperature sensor is determined to be malfunctioning;

setting, when the engine is determined to be not stalled, an initial value of information on the coolant temperature as a target value of information on the coolant temperature and determining whether a start mode is canceled, the target value of information on the coolant temperature being previously established by a predetermined value in preparation for the engine being stalled;

determining whether the air temperature sensor is malfunctioning when the start mode is not canceled;

setting, when the air temperature sensor is outputting information normally, the information on the air temperature as a target value of information on the air temperature and performing addition and subtraction operations on the initial value of information on the coolant temperature and updating and learning the initial value of information on the coolant temperature with new information on the coolant temperature until the initial value of information on the coolant temperature reaches the target value of information on the coolant temperature; and outputting an engine control signal according to newly learned information on the coolant temperature, and when the newly learned information on the coolant temperature reaches the target value of information on the coolant temperature, terminating the updating of the initial value of information on the coolant temperature, and outputting an engine control signal to start the engine and to control idling of the engine after the engine is started by using the target value of information on the coolant temperature as the final learned information on the coolant temperature.

2. The method of claim 1, wherein the method comprises the steps of:

setting, when the coolant temperature sensor and the air temperature sensor are out of order, the initial value of information on the coolant temperature with an initial value that is set in the event the engine is stalled, setting the target value of information on the coolant temperature with a target value of the air temperature that is set when the air temperature sensor is out of order, performing addition and subtraction operations on the initial value of information on the coolant temperature until the initial value of information on the coolant temperature reaches the target value of information on the coolant temperature, and updating the initial value of information on the coolant temperature with new information on the coolant temperature, and learning the updated result; and outputting an engine control signal according to new information on the coolant temperature, and when the newly learned information on the coolant temperature reaches the target value of information on the coolant temperature, terminating the updating of the initial value of information on the coolant temperature, and setting the target value of information on the coolant temperature as a final learned information on the coolant temperature arid outputting an engine control signal to start the engine and control idling of the engine after the engine is started.

3. The method of claim 1, wherein the method comprises the steps of:

determining, when a start mode is canceled, that the starting of the engine is finished, setting the target value of information on the coolant temperature with the target value of information on the coolant temperature after the starting of the engine is finished, performing addition and subtraction operations on the finally learned information on the coolant temperature at the time the engine is started until the finally learned information on the coolant temperature reaches the target value of information on the coolant temperature after the starting of the engine is finished, and updating the information on the coolant temperature with respect to a predetermined time and performing a re-learning operation; and outputting an engine control signal according to the updated and re-learned information on the coolant temperature, and when the relearned information on the coolant temperature reaches the target value of information on the coolant temperature, terminating the updating of the initial value of information on the coolant temperature, setting the target value of information on the coolant temperature as the finally learned information on the coolant temperature, and outputting an engine control signal to control idling after the engine is started.

4. The method of claim 1, wherein the method comprises the step of:

setting, when the engine is stalled, the target value of information on the coolant temperature with the target value of information on the coolant temperature that is set when the engine is stalled, outputting an engine control signal, and when the ignition switch, manipulated by a driver, is turned off because the engine is stalled, terminating all the control operations.

5. A method for controlling an engine during the malfunctioning of a coolant temperature sensor, comprising the steps of:

determining whether the coolant temperature sensor is malfunctioning based on information on the temperature of coolant supplied from the coolant temperature sensor, on information on intake air supplied from an air temperature sensor, on information on engine rpm supplied from an ignition coil, on information about on and off states of an ignition switch supplied from an ignition switch sensor, and on information about a throttle valve opening supplied from a throttle valve switch;

determining whether the engine is stalled when the coolant temperature sensor is determined to be malfunctioning;

if the engine is not stalled, setting an initial value of information on the coolant temperature as a target value of information on the coolant temperature and determining whether a start mode is canceled, wherein the target value of information on the coolant temperature is pre-set;

if the start mode is not cancelled, determining whether the air temperature sensor is malfunctioning;

if the air sensor is operating normally, setting the information on the air temperature as a target value of information on the air temperature, and performing addition and subtraction operations on the initial value of information on the coolant temperature and updating the initial value of information on the coolant temperature with new information on the coolant temperature until the initial value of information on the coolant temperature reaches the target value of information on the coolant temperature; and outputting an engine control signal according to newly updated information on the coolant temperature, and when the newly updated information on the coolant temperature reaches the target value of information on the coolant temperature, terminating the updating of the initial value of information on the coolant temperature, and outputting an engine control signal to start the engine and to control idling of the engine after the engine is started by using the target value of information on the coolant temperature as the final updated information on the coolant temperature.

6. The method of claim 5, wherein the target value of information on the coolant temperature is pre-set in anticipation of the engine stalling.

* * * * *

UNITED STATES PATENT AND TRADEMARK OFFICE
CERTIFICATE OF CORRECTION

PATENT NO.     : 6,283,092 B1
DATED          : September 4, 2001
INVENTOR(S)    : Chul-Hwa Jung It is certified that error appears in the above-identified patent and that said Letters Patent is hereby corrected as shown below:

<u>Title page,</u>
Item [57], ABSTRACT,
Line 11, replace "to he operating" with -- to be operating --.

<u>Drawings,</u>
FIG. 4, Sheet 6, in boxes S560 and S542 replace "edule" with -- equal -- (both occurrences).

<u>Column 9,</u>
Line 15, replace "arid" with -- and --.

Signed and Sealed this

Eighteenth Day of March, 2003

JAMES E. ROGAN
*Director of the United States Patent and Trademark Office*